United States Patent Office 3,145,688
Patented Aug. 25, 1964

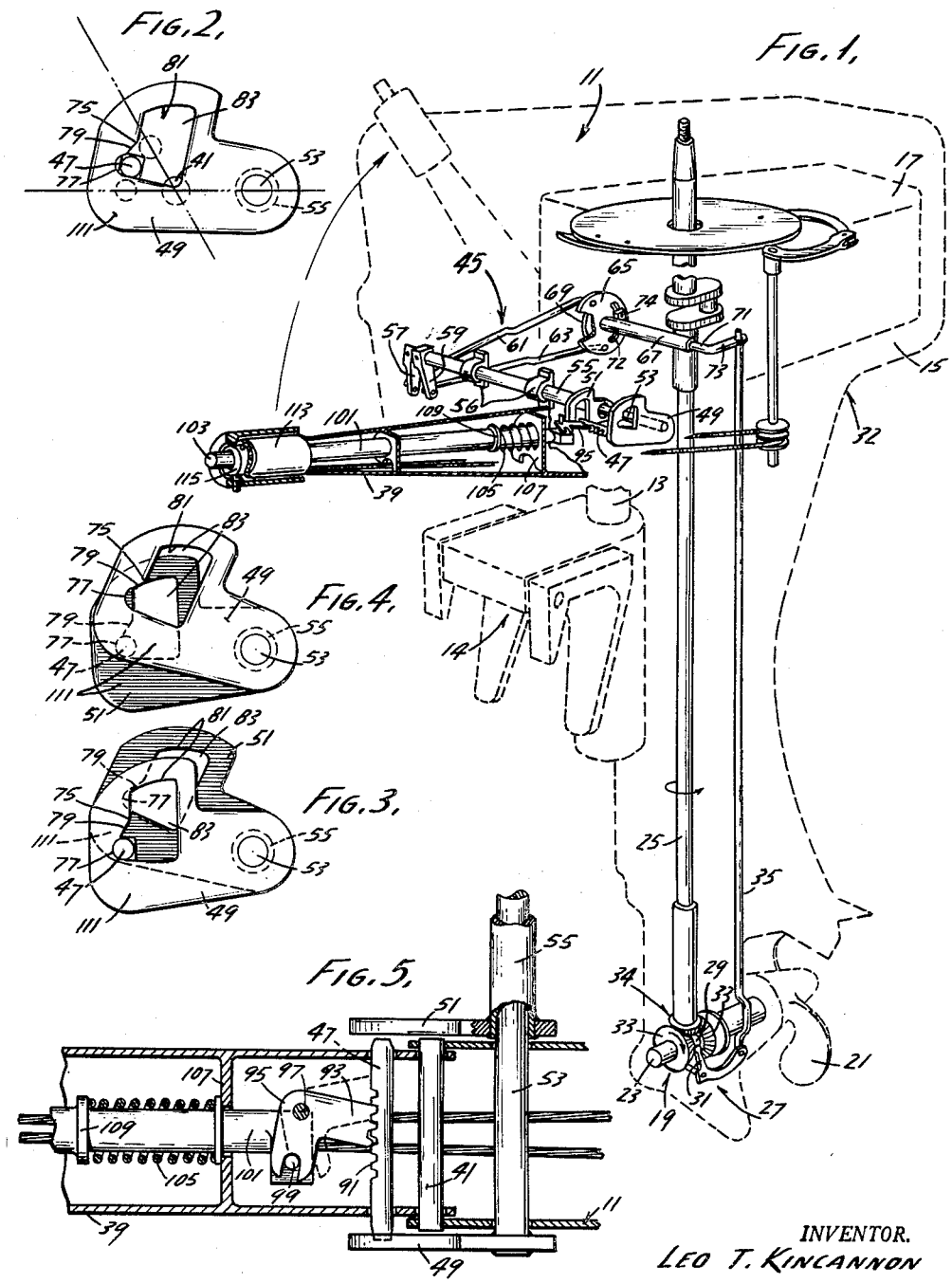

3,145,688
SHIFT CONTROL BY MANIPULATION OF
TILLER HANDLE
Leo T. Kincannon, Milwaukee, Wis., assignor to Outboard Marine Corporation, Waukegan, Ill., a corporation of Delaware
Filed Mar. 12, 1962, Ser. No. 178,987
7 Claims. (Cl. 115—18)

This invention relates to a tiller actuated reversing clutch for an outboard motor.

The outboard motor may have any appropriate arrangement, including a tiller, for steering. The tiller is pivoted to the motor for swinging movement in a vertical plane relative to a normal steering position to control the reversing clutch. When the tiller is raised from its normal steering position, the reversing clutch is in neutral. As the tiller is moved downwardly into normal steering position, the reversing clutch is engaged. A button in the end of the tiller is used to determine whether the engagement will be for forward or for rearward propulsion. The linkage operable by the tiller and the control button to actuate the clutch does not preclude the use of a tiller equipped for throttle control if desired.

The tiller actuated clutch control also advantageously affords disengagement of the reversing clutch when the tiller is held in the hand and the motor is tilted upwardly and relative to the tiller, as when striking a submerged object.

The preferred embodiment also provides interlock means preventing disengagement of the reversing clutch in the absence of shifting of the tiller to its elevated neutral position. The invention also provides a linkage operable by the tiller to control operation of the clutch incorporated in an outboard motor. Other advantages of the invention will become apparent by reference to the following description and the accompanying drawings of one embodiment.

In the drawings:

FIGURE 1 is a partially diagrammatic perspective view of a tiller operated clutch arrangement in an outboard motor, which arrangement incorporates various of the features of the invention;

FIGURE 2 is an enlarged elevational view of the cam elements in their neutral position;

FIGURE 3 is an enlarged elevational view of the cam elements in their forward drive position;

FIGURE 4 is an enlarged elevational view of the cam elements in their rearward drive position; and FIGURE 5 is an enlarged fragmentary plan view of a portion of the linkage connecting the tiller to the clutch.

The outboard motor shown in FIGURE 1 may be conventionally constructed to include a propulsion unit 11 which is horizontally pivotable for steering purposes about a vertically disposed swivel post 13, which in turn, is securable to the transom of a boat by an appropriate bracket 14. The propulsion unit 11 includes a power head 15 including an engine 17 and a lower unit 19 in unitary connection with the power head. In the lower unit is a propeller shaft 23 on which a propeller 21 is mounted. Power transmission means including a shaft 25 transmits power from the engine 17 to the propeller shaft 23 subject to control of a reversing clutch means 27 which includes a pair of clutch means and which also constitutes a part of the power transmission means. The disclosed reversing clutch means 27 includes a dog 29 which is shiftable axially of the propeller shaft 23 to either side of a neutral position by a pivotally mounted fork 31 to thereby selectively connect one of two bevel gears 33 in a reverser 34 with the propeller shaft 23. The activating fork 31 is shifted by means of a shift rod or link 35 which extends, from adjacent the propeller shaft 23, through the lower unit 19, and into the housing 32 enclosing the power head 15.

Whatever the steering arrangement, a tiller 39 is mounted to the propulsion unit 11 by a pivot 41 (see FIGURE 5) which affords vertical swinging movement of the tiller relative to the propulsion unit. If desired, throttle control means can also be incorporated in the tiller.

Control of the clutch means 27 by the tiller 39 is afforded by a linkage means 45 which permits full swinging of the tiller to a retracted storage position, indicated in partial dotted outline in FIGURE 1, and which utilizes a portion of such vertical path of travel to control the clutch means. More specifically, the tiller is freely swingable, from a normal operating, clutch engaging, or drive position in which the dog 29 is positioned in engagement with one of the bevel gears 33, upwardly through a neutral position in which the dog 29 is disengaged from both bevel gears 33, and to its retracted storage position. Travel of the tiller from the neutral position to the storage position does not affect the clutch means which remains in neutral.

The linkage by which the clutch is shifted incident to vertical swinging of the tiller includes a transversely shiftable actuator bar 47 carried by the tiller for selective engagement with either one of a pair of cam elements 49 and 51 to effect vertical swinging of the engaged cam element in one direction, and, as will be apparent, to effect corresponding vertical swinging in the opposite direction of the non-engaged cam element. The cam elements 49 and 51 are respectively fixed on telescopically related shafts 53 and 55 which shafts are supported by suitable journal means 56 mounted on the housing 32. In turn, the shafts 53 and 55 have respectively fixed thereto crank arms 57 and 59. Pivotally connected to the crank arms 57 and 59 are respective links 61 and 63 which, in turn, are connected to a rotatable member or disk 65 in opposing off-center relation so that movement of one of the links in response to shifting of the associated cam elements results in rotation of the disk 65 and accompanying opposite movement of the other link with resultant opposite swinging movement of the other cam element.

Extending from the disk 65 is a hollow shaft 67 which is carried by a suitable bearing (not shown) mounted to the propulsion unit 11. Extending through the shaft 67 from a disk 69 is a shaft 71 including a right angle portion or shift lever 73 coupled to the clutch shift rod 35. The disks 65 and 69 are fixedly secured to each other, so as to impart vertical rocking of the shift lever 73 in response to rotation of the disk 65, by means including an arcuate slot 72 in the disk 65 and a bolt which projects from the disk 69 through the slot 72 and is engaged with a nut 74. Release of the nut 74 relative to the bolt permits angular adjustment of the disks 65 and 69 relative to each other.

The cam elements 49 and 51 are of generally identical construction and include internal camming surfaces 75 which are in general alignment when the tiller is in its neutral position. In this connection, the telescopically related shafts 53 and 55 are carried by the propulsion unit to locate their center of rotation rearwardly of the tiller pivot 41 so that upward swinging of the tiller from its depressed drive position causes the transversely disposed actuator bar to move progressively radially closer to the center of cam rotation.

The camming surfaces 75 are designed to take advantage of this movement and include a forwardly located detent portion 77, an upwardly extending arcuate portion 79 extending from the detent portion and defined by a radius which extends from the pivot 41 when the camming elements are in their neutral position, and a further upwardly extending edge 81 which eventually connects with the lower part of the detent portion to provide a clearance opening 83.

By reason of the above arrangement, when the tiller 39 is swung upwardly from normal steering position, the cam element engaged by the bar 47 is also swung upwardly to its neutral position by reason of engagement by the bar 47 in the detent portion 77. At the same time, the non-engaged element swings downwardly until the cam elements become aligned in their neutral position.

As before indicated, the bar 47 is transversely shiftable for selective engagement of the cam elements 49 and 51 when the tiller is in or above its neutral position. In this regard, the bar 47 is normally biased for engagement with the cam element 49 to provide for forward drive connection of the engine 17 with the propeller shaft 23 incident to movement of the tiller to its normal steering position. However, means are provided for overpowering the biasing means so as to disengage the bar 47 from the cam element 49 and to engage the bar with the cam element 51.

More specifically, the bar includes a rack portion 91 which is meshed with the gear segment part 93 of a bell crank lever 95 mounted on a pivot pin 97 supported by the tiller 39. The bell crank lever 95 is shiftably engaged by a pin 99 carried by a reciprocally movable rod 101 mounted with the tiller 39. The rod 101 can be externally actuated to provide for such reciprocal movement as will pivot the crank lever to cause transverse shifting of the bar, by suitable means such as a button or trigger. In the disclosed construction a simple button 103 at the free end of the tiller is utilized. The rod 101 is biased by a spring 105 confined between a web part 107 in the tiller and an annular shoulder 109 on the rod 101 to extend the button 103 outwardly, thereby effecting engagement of the bar 47 with the cam element 49. Depression of the button 103 overpowers the spring 105 and acts to shift the bar into engagement with the cam element 51.

The cam elements 49 and 51 also incorporate means operable to prevent disengagement of the bar 47 from a condition of engagement with the opposed cam element when the tiller is depressed from its neutral position. Specifically, the cam elements extend forwardly and downwardly from the detent portions 77 in the areas 111 so as to obstruct transverse movement of the adjacent end of the actuator bar, except when the cam elements are aligned when the tiller is in its neutral position.

Various arrangements can be readily incorporated in the tiller 49 for throttle control. For purposes of nominal example only, the disclosed construction shows schematically the arrangement shown in the Shimanckas Patent 2,740,306, issued April 3, 1958. In this regard, the bearing sleeve 113 in the Shimanckas arrangement is mounted telescopically around the rod 103 to permit relative axial and rotative movement therebetween. The anchor block 115 employed in the Shimanckas construction is apertured through the center to permit passage of the rod.

Preferably, the throttle control arrangement is operably interrelated with vertical movement of the tiller relative to the propulsion unit so that an engine throttle setting above a predetermined value is prevented by automatic reduction of the throttle setting, when the tiller moves from its normal steering position to its neutral position. Such reduction in the throttle setting is especially desirable to prevent over-speed operation of the engine when, in response to striking of a submerged object, the propulsion unit is swung upwardly and, as a consequence of the relative vertical movement between the tiller and the propulsion unit, the tiller acts to disengage the reversing clutch means.

Various of the features of the invention are set forth in the following claims.

What is claimed is:

1. An outboard motor having steering means including a tiller, a propeller, a power shaft, a propeller shaft, power transmission means including clutch means for connecting said power shaft to said propeller shaft for operation in forward drive connection and clutch means for connecting said power shaft to said propeller shaft for operation in rearward drive connection, means mounting said tiller for vertical pivotal movement on one side only of a neutral position, means connecting said tiller with each of said clutch means for actuation of a selected one of said clutch means to connect said power shaft to said propeller shaft in response to movement of said tiller away from said neutral position and for disconnecting said propeller shaft from said power shaft in response to movement of said tiller toward said neutral position, and means for selectively determining which one of said clutch means will be actuated in response to movement of said tiller away from said neutral position.

2. A device in accordance with claim 1 including means biasing said selective operating means so as to normally effect forward driving connection of said power shaft to said propeller shaft incident to movement of said tiller from said neutral position.

3. A device in accordance with claim 2 including means for overpowering the operation of said biasing means to afford rearward driving connection of said power shaft to said propeller shaft, and means operable, when said power shaft is in rearward drive connection with said propeller shaft, for preventing shifting of said clutch means from said rearward drive connection in the absence of tiller movement to said neutral position.

4. A device in accordance with claim 1 including means for preventing shifting of the connection of said propeller shaft and said power shaft between forward and rearward drive connections when said tiller is spaced from said neutral position.

5. An outboard motor having steering means including a tiller and having a propeller, a power shaft, a propeller shaft, power transmission means including clutch means for connecting said power shaft to said propeller shaft, means mounting said tiller for vertical pivotal movement between a neutral position and a normal steering position which is depressed relative to said neutral position, a bar movably carried by said tiller for transverse movement relative thereto and for vertical swinging movement accompanying vertical rocking of said tiller, a pair of cam elements selectively engageable by said bar incident to transverse movement thereof when said tiller is in its neutral position, spring means biasing said bar into engagement with one of said cam elements, to thereby effect vertical rocking of said one cam element incident to vertical rocking of said tiller, means operable against the action of said spring means to engage said bar with the other one of said cam elements to thereby effect vertical rocking of said other cam element incident to vertical rocking of said tiller, means on said cam elements co-operating with said bar for preventing disengagement of said bar from the engaged one of said cam elements when said tiller is rocked below said neutral position, a pair of axially rotatable, telescopically related shafts respectively carrying said cam elements, a pair of oppositely acting links connected respectively to said telescopic shafts, a shift lever connected to said clutch means and operable to effect shifting of said clutch means incident to vertical movement thereof, and means connecting said links to said shift lever to effect, incident to movement of one of said links as a result of vertical rocking of the associated one of said cam elements, vertical movement of said shift lever and opposite movement of the other one of said links whereby the other one of said cam elements is vertically rocked in the opposite direction so that said disengagement preventing means is actuated incident to rocking of said tiller from said neutral position and so that said cam elements approach a mutually aligned position wherein said bar can be shifted therebetween incident to rocking of said tiller toward said neutral position.

6. A device in accordance with claim 1 wherein said tiller is elongated and includes means rotatable about a lengthwise tiller axis for controlling the power output of the motor.

7. The combination in an outboard motor of steering means including a tiller, a propeller, a power shaft, a propeller shaft, power transmission means including clutch means for selectively connecting said power shaft to said propeller shaft for operation in forward drive connection and in rearward drive connection, means mounting said tiller for vertical pivotal movement between a neutral position and a predetermined clutch engaging position, and means connecting said tiller with said clutch means for selective actuation of said clutch means to connect said power shaft to said propeller shaft in a selected one of said forward drive and said rearward drive connections in response to movement of said tiller from said neutral position to said same predetermined clutch engaging position and for disconnecting said propeller shaft from said power shaft in response to movement of said tiller to said neutral position.

References Cited in the file of this patent

UNITED STATES PATENTS

| 2,642,829 | Kiekhaefer | June 23, 1953 |
| 2,696,188 | Armstrong | Dec. 7, 1954 |
| 2,729,186 | Kloss | Jan. 3, 1956 |